(12) United States Patent
Vedantham et al.

(10) Patent No.: US 11,082,238 B2
(45) Date of Patent: *Aug. 3, 2021

(54) SECURE NETWORK AUTHENTICATION AT A GATEWAY FOR NON-INTERNET PROTOCOL ENABLED DEVICES

(71) Applicant: TEXAS INSTRUMENTS INCORPORATED, Dallas, TX (US)

(72) Inventors: Ramanuja Vedantham, Allen, TX (US); Alejandro Martin Lampropulos, Barcelona (ES); Arvind Kandhalu Raghu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/719,737

(22) Filed: Dec. 18, 2019

(65) Prior Publication Data

US 2020/0128405 A1  Apr. 23, 2020

Related U.S. Application Data

(63) Continuation of application No. 15/449,858, filed on Mar. 3, 2017, now Pat. No. 10,536,853.

(51) Int. Cl.
*H04L 9/32* (2006.01)
*H04L 29/06* (2006.01)
(Continued)

(52) U.S. Cl.
CPC .......... *H04L 9/3247* (2013.01); *H04L 9/3271* (2013.01); *H04L 63/0428* (2013.01);
(Continued)

(58) Field of Classification Search
CPC . H04L 9/3247; H04L 9/3271; H04L 63/0428; H04L 63/083; H04L 63/06;
(Continued)

(56) References Cited

U.S. PATENT DOCUMENTS 7,260,638 B2 ‡  8/2007  Crosbie .................. H04L 63/10
                                                           707/999.009
8,472,630 B2 *  6/2013  Konrad ................... H04L 9/002
                                                           380/282
(Continued)

OTHER PUBLICATIONS

Padgette et al, "Guide to Bluetooth Security", May 2017, NIST Special Publication 800-121 Revision 2, p. 1-67.*

(Continued)

*Primary Examiner* — Christopher A Revak
(74) *Attorney, Agent, or Firm* — Brian D. Graham; Charles A. Brill; Frank D. Cimino

(57) ABSTRACT

A method for network authentication of wireless devices at a gateway is provided that includes scanning a wireless network by the gateway to discover unjoined wireless devices, joining a discovered wireless device to the gateway using a non-internet protocol implemented by the wireless device, wherein the joining results in an encrypted connection between the gateway and the wireless device, and authenticating the discovered wireless device to the gateway via the encrypted connection, wherein authentication is performed according to an authentication protocol of a network protocol management layer of the gateway.

20 Claims, 6 Drawing Sheets

(51) Int. Cl.
*H04W 4/80* (2018.01)
*H04W 12/033* (2021.01)
*H04W 12/041* (2021.01)
*H04W 12/069* (2021.01)
*H04W 12/0431* (2021.01)
*H04W 12/0433* (2021.01)
*H04W 88/16* (2009.01)
*H04W 4/70* (2018.01)
*H04W 84/20* (2009.01)

(52) U.S. Cl.
CPC ............ *H04L 63/06* (2013.01); *H04L 63/083* (2013.01); *H04W 4/80* (2018.02); *H04W 12/033* (2021.01); *H04W 12/041* (2021.01); *H04W 12/0431* (2021.01); *H04W 12/0433* (2021.01); *H04W 12/069* (2021.01); *H04L 2209/80* (2013.01); *H04W 4/70* (2018.02); *H04W 84/20* (2013.01); *H04W 88/16* (2013.01)

(58) Field of Classification Search
CPC .......... H04L 2209/80; H04W 12/0013; H04W 12/0401; H04W 12/04031; H04W 12/04033; H04W 12/0609; H04W 4/80; H04W 84/20; H04W 4/70; H04W 88/16
See application file for complete search history.

(56) References Cited

U.S. PATENT DOCUMENTS

| | | | | |
|---|---|---|---|---|
| 8,908,562 B2 ‡ | 12/2014 | Zhang | ............. | H04W 24/02 370/254 |
| 9,049,042 B2 ‡ | 6/2015 | Tagg | ............. | H04L 12/2856 |
| 9,294,562 B2 ‡ | 3/2016 | Gong | ............. | H04L 67/104 |
| 9,363,108 B2 * | 6/2016 | Bell | ............. | H04W 76/14 |
| 10,178,533 B2 ‡ | 1/2019 | Saldin | ............. | G08B 25/008 |
| 10,231,123 B2 * | 3/2019 | Schussmann | ..... | H04W 12/0013 |
| 10,536,853 B2 * | 1/2020 | Vedantham | ....... | H04W 12/0609 |
| 2005/0117750 A1 * | 6/2005 | Rekimoto | ............. | H04L 63/062 380/247 |
| 2010/0332666 A1 ‡ | 12/2010 | Hamachi | ............. | H04L 41/0806 709/228 |
| 2011/0169654 A1 * | 7/2011 | Ketari | ............. | G08B 13/1427 340/687 |
| 2015/0264724 A1 * | 9/2015 | Yao | ............. | H04W 4/80 705/39 |
| 2015/0350894 A1 * | 12/2015 | Brand | ............. | H04L 9/0863 380/270 |
| 2016/0029215 A1 ‡ | 1/2016 | Jung | ............. | H04W 12/06 713/168 |
| 2016/0066129 A1 * | 3/2016 | Seidenberg | ....... | H04W 12/0013 455/41.2 |
| 2016/0212572 A1 ‡ | 7/2016 | Tang | ............. | H04W 8/005 |
| 2016/0294783 A1 ‡ | 10/2016 | Piqueras Jover | ... | H04L 63/0442 |
| 2017/0060254 A1 | 3/2017 | Molchanov et al. | | |
| 2019/0141506 A1 ‡ | 5/2019 | Saldin | ............. | H04W 4/80 |

OTHER PUBLICATIONS

"Bluetooth Smart to Wi-Fi IoT Gateway", TIDUA62B, Texas Instruments, Inc., Jul. 2015, revised Jan. 2016, pp. 1-50.‡
Joe Folkens, "Building a Gateway to the Internet of Things", Texas Instruments, Inc., Dec. 2014, pp. 1-11.‡
"Specification of the Bluetooth System, Bluetooth Core Specification Addendum 5", Bluetooth SIG, Dec. 15, 2015, pp. 1-18.‡
"Wireless Connectivity Guide", SLAB056D, Texas instruments, Inc., 4Q 2014, pp. 1-64.‡
"Specification of the Bluetooth System, Supplement to the Bluetooth Core Specification", Bluetooth SIG, Jul. 14, 2015, pp. 1-36.‡
Carles Gomez, et al, "Overview and Evaluation of Bluetooth Low Energy: An Emerging Low-Power Wireless Technology", Sensors 2012, 12(9), Aug. 29, 2012, pp. 11734-11753.‡
"Specification of the Bluetooth System", Version 4.2, vols. 4-7, Bluetooth SIG, Dec. 2, 2014, pp. 1-377.‡
"CC2640 SimpleLink Bluetooth Wireless MCU", SWRS176B, Texas Instruments, Inc., Feb. 2015, revised Jul. 2016, pp. 1-61.‡
"CC3200 SimpleLink Wi-Fi and Internet-of-Things Solution, a Single-Chip Wireless MCU", SWAS032F, Texas Instruments, Inc., Jul. 2013, revised Feb. 2015, pp. 1-71.‡
"Specification of the Bluetooth System", Version 4.2, vol. 3, Parts A-G, Bluetooth SIG, Dec. 2, 2014, pp. 1-585.‡
"Specification of the Bluetooth System", Version 4.2, vol. 3, Part H, Bluetooth SIG, Dec. 2, 2014, pp. 1-118.‡
"Specification of the Bluetooth System", Version 4.2, vols. 0-2, Bluetooth SIG, Dec. 2, 2014, pp. 1-1692.‡
"Specification of the Bluetooth System", Specification vol. 3, Bluetooth SIG Proprietary, Dec. 2, 2014, pp. 1-585.

* cited by examiner
‡ imported from a related application

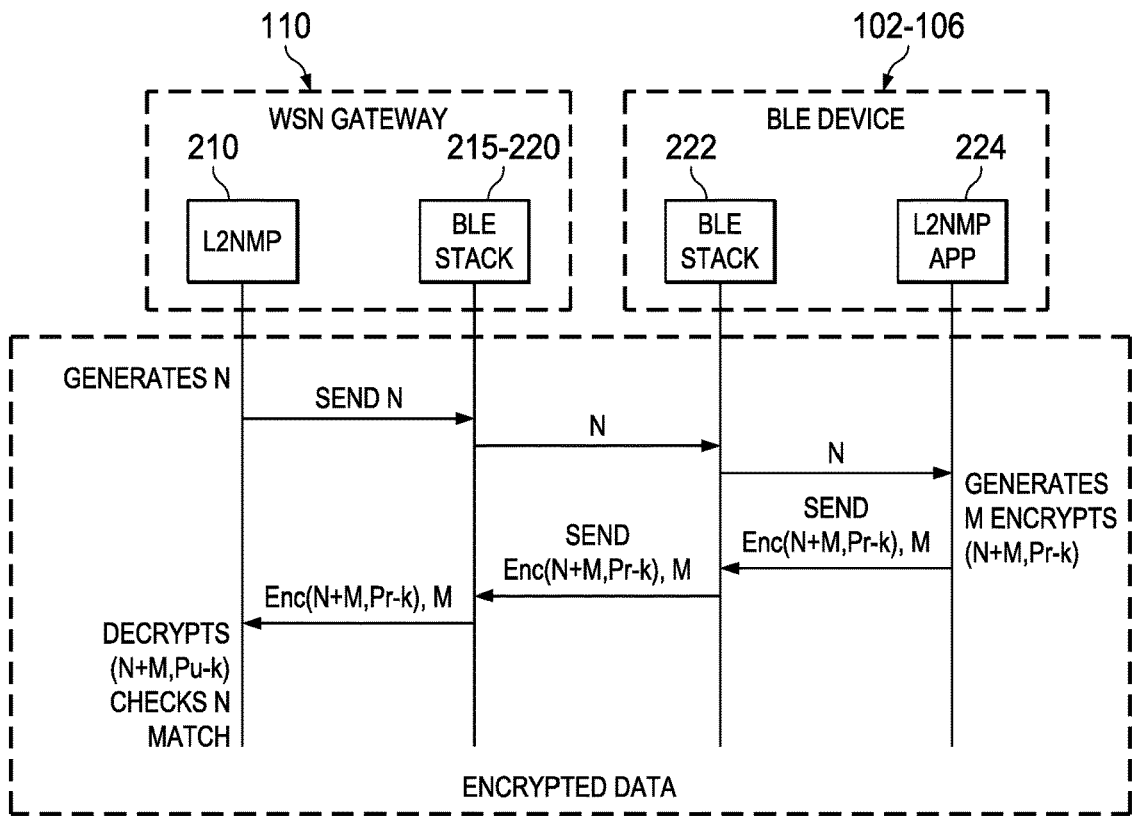
FIG. 5
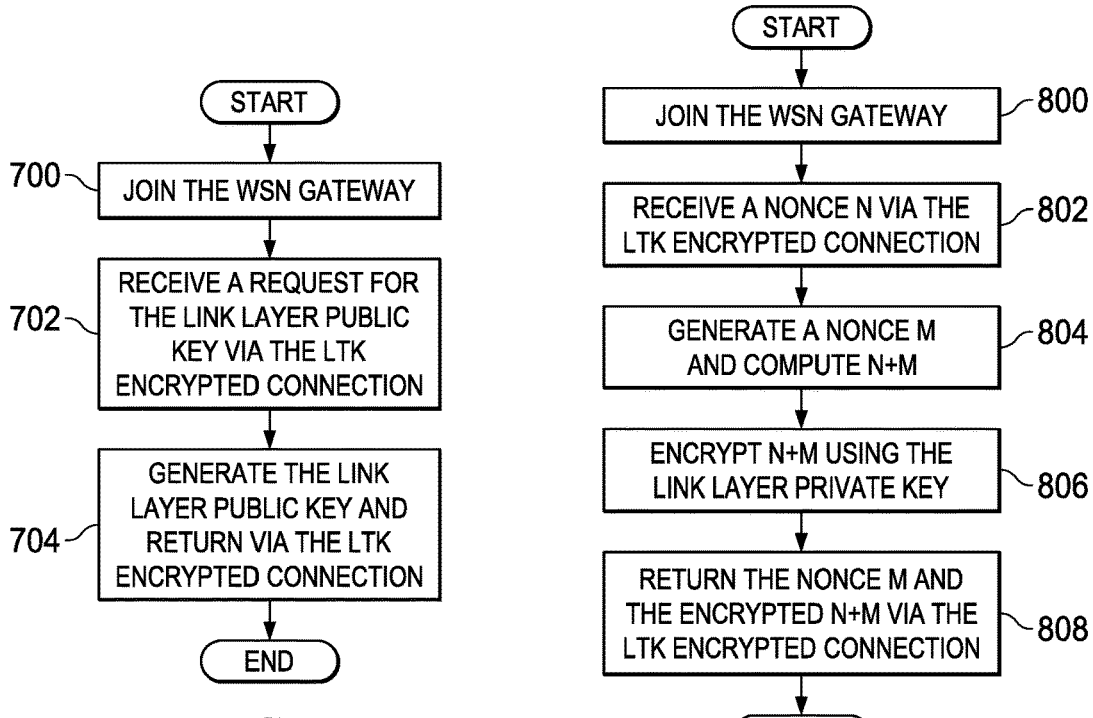
FIG. 7
FIG. 8

SECURE NETWORK AUTHENTICATION AT A GATEWAY FOR NON-INTERNET PROTOCOL ENABLED DEVICES

CROSS REFERENCE TO RELATED APPLICATIONS

This application is a continuation of prior U.S. application Ser. No. 15/449,858, filed Mar. 3, 2017, which is herein incorporated by reference in its entirety.

BACKGROUND OF THE DISCLOSURE

Field of the Disclosure

Embodiments of the present disclosure generally relate to networks, and more specifically relate to device authentication in networks.

Description of the Related Art

Wireless sensor networks, sometimes referred to as wireless sensor and actuator networks, are being deployed in many different environments. For example, a wireless sensor network may include sensor nodes spatially distributed in a home, office building, or factory to help with energy management, comfort enhancement, security, diagnostics, and other applications. The sensor devices used in such networks are typically low cost devices with limited storage, computation speed, communication bandwidth, and power. The primary function of these devices is generally data acquisition, with an attendant function of cooperatively communicating the acquired data through the wireless network to a gateway. The network protocol used in a wireless sensor network is typically a protocol designed for use on resource limited devices, e.g., Bluetooth Low Energy (BLE) or ZigBee.

A gateway in a wireless sensor network may provide, for example, device connectivity to another network, protocol translation, data filtering and processing, and security. In some applications, the gateway connects the wireless sensor network to the Internet using Wi-Fi technology and Internet Protocol (IP), and thus the gateway communicates with devices in the wireless sensor network using the protocol of the wireless sensor network and communicates on the Internet using IP. Further, the gateway provides protocol translation between the protocol of the wireless sensor network and IP.

SUMMARY

Embodiments of the present disclosure relate to methods and apparatus for secure network authentication at a gateway. In one aspect, a method for network authentication of wireless devices at a gateway is provided that includes scanning a wireless network by the gateway to discover unjoined wireless devices, joining a discovered wireless device to the gateway using a non-internet protocol implemented by the wireless device, wherein the joining results in an encrypted connection between the gateway and the wireless device, and authenticating the discovered wireless device to the gateway via the encrypted connection, wherein authentication is performed according to an authentication protocol of a network protocol management layer of the gateway.

In one aspect, a method for network authentication of a wireless device at a gateway is provided that includes joining the wireless device to the gateway using a non-internet protocol implemented by the wireless device, wherein the joining results in an encrypted connection between the gateway and the wireless device, and responding to an authentication request from the gateway via the encrypted connection, wherein authentication is performed according to an authentication protocol of a network protocol management layer of the gateway.

In one aspect, a gateway for a wireless network is provided that includes a memory storing software instructions to cause a processor to perform authentication of a wireless device in the wireless network to the gateway, the software instructions including instructions to cause the gateway to scan the wireless network to discover unjoined wireless devices, join a discovered wireless device to the gateway using a non-internet protocol implemented by the wireless device, wherein the joining results in an encrypted connection between the gateway and the wireless device, and authenticate the discovered wireless device to the gateway via the encrypted connection, wherein authentication is performed according to an authentication protocol of a network protocol management layer of the gateway, and at least one processor coupled to the memory to execute the software instructions.

In one aspect, a wireless device is provided that includes a memory storing software instructions to cause a processor to perform authentication of the wireless device to a gateway, the software instructions including instructions to cause the wireless device to join the gateway using a non-internet protocol implemented by the wireless device, wherein the joining results in an encrypted connection between the gateway and the wireless device, and respond to an authentication request from the gateway via the encrypted connection, wherein authentication is performed according to an authentication protocol of a network protocol management layer of the gateway, and a processor coupled to the memory to execute the software instructions.

BRIEF DESCRIPTION OF THE DRAWINGS

Particular embodiments will now be described, by way of example only, and with reference to the accompanying drawings:

FIG. 5 is a sequence chart illustrating network authentication of a BLE device rejoining a WSN gateway;

FIG. 7 is a flow diagram of a method for secure network authorization in a BLE device joining a WSN gateway for the first time;

FIG. 8 is flow diagram of a method for secure network authorization in a BLE device rejoining a WSN gateway;

DETAILED DESCRIPTION OF EMBODIMENTS OF THE DISCLOSURE

Figure 1:
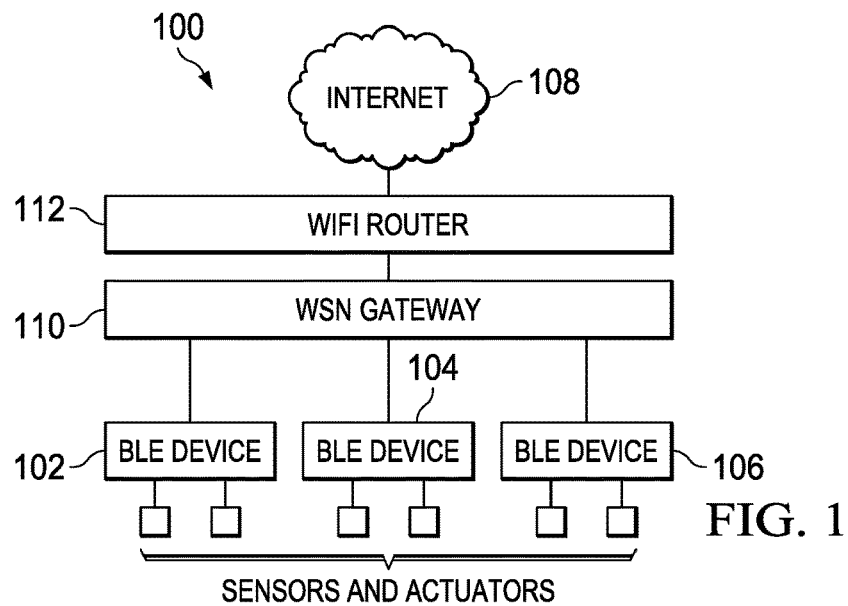
FIG. 1 is simple example of a network configuration.

Specific embodiments of the disclosure will now be described in detail with reference to the accompanying figures. Like elements in the various figures are denoted by like reference numerals for consistency.

FIG. 1 depicts a simple example of a network configuration 100 in which non-internet protocol (non-IP) devices 102, 104, 106 in a wireless sensor network (WSN) communicate over the Internet 108 via a WSN gateway 110 coupled to a Wi-Fi router 112. As previously mentioned, due to factors such as resource limitations, devices in a wireless sensor network (WSN) typically communicate using a network protocol designed for use in a resource constrained network. In the example of FIG. 1, the devices 102, 104, 106 communicate in the WSN and with the WSN gateway 110 using Bluetooth Low Energy (BLE), also referred to as Bluetooth Smart. As BLE is a known technology, high level descriptions of those aspects of relevance to the current disclosure are provided herein. More information regarding BLE may be found, for example, in "Specification of the Bluetooth System, Covered Core Package," Version 4.2, The Bluetooth Special Interest Group, Kirkland, Wash., Dec. 2, 2014, which is incorporated by reference herein.

The WSN gateway 100 is configured to provide secure internet connectivity for the non-IP devices 102, 104, 106. Some of the functions the WSN gateway is configured to perform include discovery and joining of devices such as the devices 102, 104, 106, rejoining previously joined devices, and translation of BLE data to IP data and vice versa. As part of joining and rejoining devices, the WSN gateway 100 is configured to provide secure authentication of the joining or rejoining devices. Embodiments of secure authentication for joining are described in reference to FIG. 4 and embodiments of secure authentication for rejoining are described in reference to FIG. 5.

Figure 2:
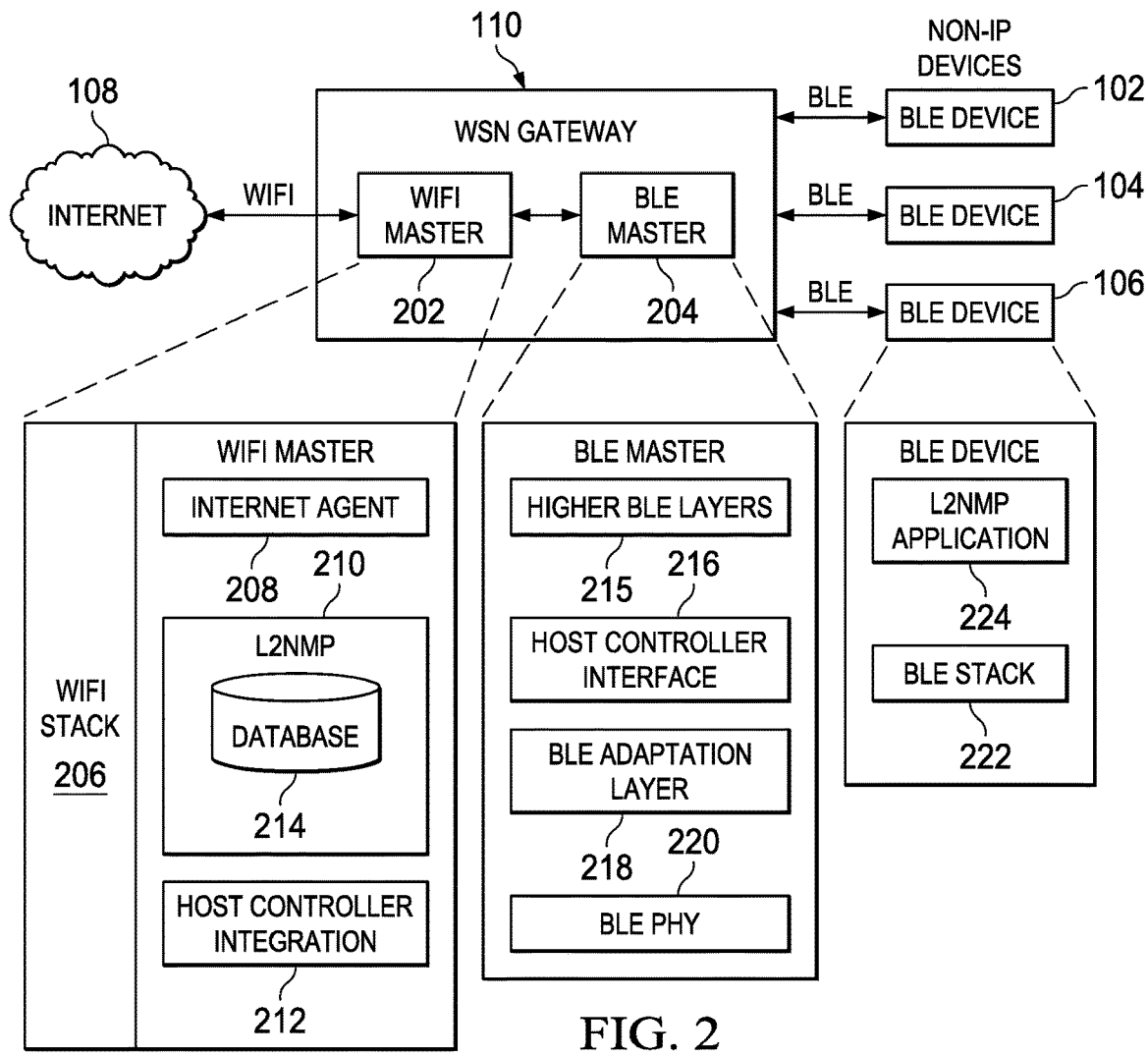
FIG. 2 is simplified example block diagram of a wireless sensor network (WSN) gateway.

FIG. 2 is a simplified example block diagram of the WSN gateway 110. The WSN gateway 110 includes a Wi-Fi master system-on-a-chip (SoC) 202 coupled to a BLE master SoC 204. The Wi-Fi master SoC 202 is configured to provide Wi-Fi connectivity to the internet using the standard internet protocol (IP). The BLE master SoC 204 is configured to provide connectivity between the WSN gateway 110 and the WSN devices 102, 104, 106.

Functional components of the network stack implemented by the WIFI master SoC 202 include the internet agent layer 208, the link layer network management protocol (L2NMP) layer 210, the host control integration layer 212, and the WIFI stack 206. The Wi-Fi stack 206 provides the functionality to connect the WSN gateway 110 to the internet 108. The functionality may include IEEE 802.11 (Wi-Fi) physical (PHY) layer, media access control (MAC) layer, and the TCP/IP stack. The internet agent layer 208 interfaces with the WIFI stack to connect the BLE devices 102, 104, 106 to the internet 108. The internet agent layer 208 implements the necessary protocols, service-agents, and management logic to facilitate interactions via the internet 108 with services, users, and devices. The host control integration layer 212 provides an interface with the host control interface (HCI) layer 216 of the BLE master SoC 204.

The L2NMP layer 210 acts as a bridge between the internet agent 208 and the BLE protocol of the BLE devices 102, 104, 106. Key functions of the L2NMP layer 210 are to provide a protocol agnostic abstraction layer between the internet agent layer 208 and the BLE master SoC 204, to perform provisioning of rejoining non-IP devices, and to perform periodic discovery of devices. The L2NMP layer 210 is configured to initiate periodic scan, link, and pair procedures to join new BLE devices to the gateway 110 and/or to rejoin previously joined BLE devices that may have been disconnected. Further, the L2NMP layer 210 is configured to authenticate BLE devices such as the BLE devices 102, 104, 106 after the joining of new BLE devices and rejoining of previously joined BLE device. The authentication protocol for a new BLE device using L2NMP is explained in reference to FIG. 4 and the authentication protocol for a rejoining BLE device is explained in reference to FIG. 5.

The L2NMP layer 210 includes a database 214 configured to store information corresponding to each non-IP device currently or previously joined to the WSN gateway 110. That is, the database may be a compilation of the following types of devices: 1) devices that are currently joined and authenticated, 2) devices that were previously joined and authenticated but are not currently joined, e.g., because the devices are currently disconnected from the WSN, and 3) devices in the WSN not yet authenticated. The database entry for a device may include an identifier for the device, the gateway link layer public key of the device, and the authentication status of the device, e.g., "not joined", "joined", "joined and authenticated."

Functional components of the network stack implemented by the BLE master SoC 204 include the BLE protocol stack which includes the BLE PHY layer 220, the BLE adaptation layer 218, the BLE host controller interface 216, and the higher BLE layers 215. The BLE adaptation layer 218 includes functionality to convert application layer packets to BLE specified format. The other layers of the standard BLE protocol stock are described in reference to FIG. 3.

Functional components of the network stack implemented by the BLE devices 102, 104, 106 include the BLE protocol stack 222 and the L2NMP application layer 224. The BLE stack is described in reference to FIG. 3. The L2NMP application layer 224 is configured to perform the device side of the L2NMP authentication for joining and rejoining of the device. The L2NMP authentication is described in reference to FIGS. 4 and 5. Additional functionality on the BLE devices 102, 104, 106 processes BLE commands and generates the appropriate response in BLE format.

Figure 3:
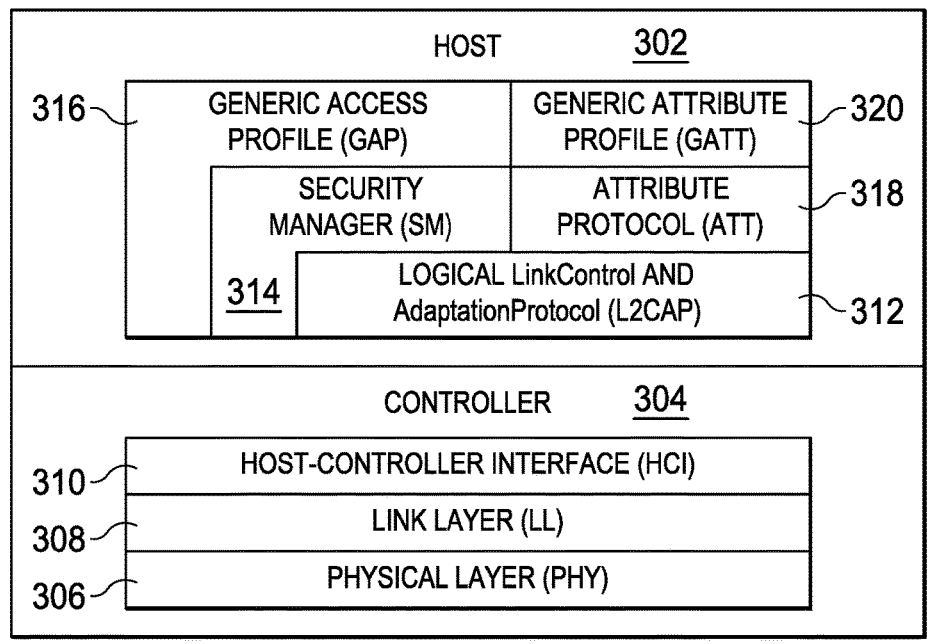
FIG. 3 is an illustration of the standard Bluetooth low energy (BLE) protocol stack.

FIG. 3 illustrates the standard BLE protocol stack. As previously mentioned, the BLE protocol stack is implemented by the BLE master SoC 204 and the BLE devices 102, 104, 106. The BLE protocol stack is divided into two sections, the controller 304 and the host 302. The controller 304 includes the physical layer (PHY) 306, the link layer 308, and the host controller interface (HCI) 310. The PHY layer 306 contains the physical communications circuitry responsible for transmitting and receiving signals. The link layer 308 controls the radio frequency state of the device and is responsible for advertising, scanning, and creating/maintaining connections. The HCI layer 310 provides a means of communication between the host 302 and the controller 304 through a standardized interface, e.g., a software interface or a hardware interface such as a universal asynchronous receiver/transmitter (UART), a serial peripheral interface (SPI), or a universal serial bus (USB).

The host 302 includes the link logical control and adaption protocol (L2CAP) layer 312, the security manager (SM) layer 314, the generic access profile (GAP) layer 316, the attribute protocol (ATT) layer 318, and the generic attribute profile (GATT) layer 320. The L2CAP layer 312 provides data encapsulation services to the upper layers of the host 302, allowing for logical, end-to-end communication of data. The SM layer 314 implements pairing and key distribution, and provides functions for the other layers of the protocol stack to securely connect to and exchange data with another device.

The GAP layer 316 directly interfaces with the application and/or profiles to handle device discovery and connection-related services for the device. The GAP layer 316 also handles the initiation of security features. The ATT layer 318 provides functionality to allow a device to expose certain pieces of data (attributes) to another device. The GATT layer 320 is a service framework that defines the sub-procedures for using the ATT layer 318, e.g., sub-procedures for data communications between two devices in a BLE connection.

Figure 4:
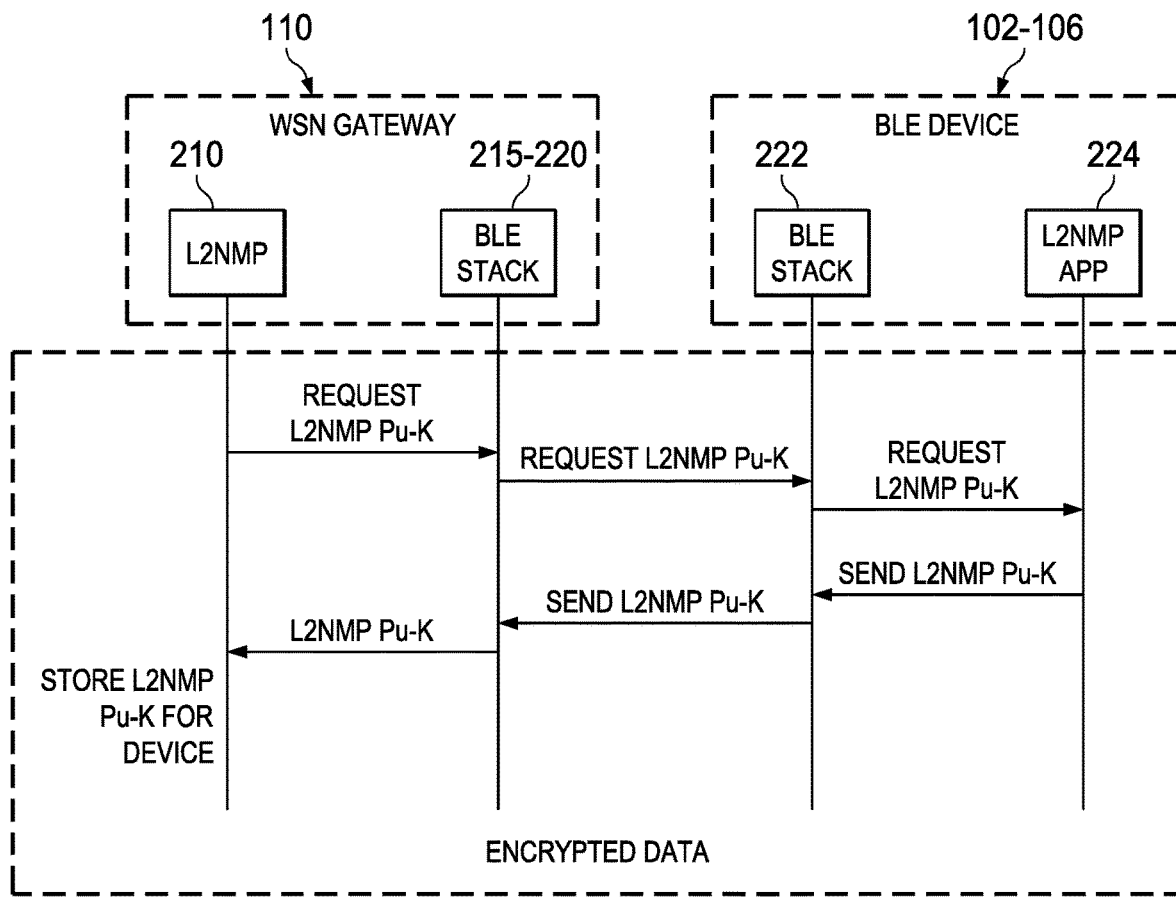
FIG. 4 is a sequence chart illustrating network authentication of a BLE device joining a WSN gateway for the first time.

FIG. 4 is a sequence chart illustrating authentication of a BLE device 102-106 using L2NMP when the device has joined the WSN gateway 110 for the first time. The illustrated command sequence is triggered in the L2NMP layer 210 of the WSN gateway 110 after the new BLE device is joined to the WSN gateway 110. A new BLE device is joined to the WSN gateway using BLE linking and pairing with Just Works authentication, i.e., without Man in the Middle, between the BLE device and the BLE master SoC 204. The end result of the linking and pairing is an encrypted connection between the BLE device and the BLE master SoC 204 that uses a long term key (LTK) shared by the BLE stack on the BLE master SoC and the BLE stack on the BLE device.

As illustrated in FIG. 4, once the joining is complete, a command is sent from L2NMP layer 210 of the WSN gateway 110 to the L2NMP application layer 224 of the BLE device to request, the L2NMP public key (Pu-K), i.e., the gateway link layer public key, for the BLE device. A packet with the command is processed through the BLE stack 215-220 of the BLE master SoC 204 for transmission to the BLE device via the encrypted connection and is thus encrypted prior to transmission using the LTK. When received by the BLE device, the encrypted transmission is processed through the BLE stack 224 of the BLE device where the transmission is decrypted using the LTK. The decrypted command is then passed to the L2NMP application layer 224 on the BLE device.

In response, the L2NMP application layer 224 generates a L2NMP public key/private key pair and sends the requested L2NMP Pu-K back to the L2NMP layer 210. The response is processed through the BLE stack 222 of the BLE device for transmission to the WSN gateway 110 via the encrypted connection between the device and the BLE master SoC 204 and is thus encrypted prior to transmission using the LTK.

When received by the BLE master SoC 204, the encrypted transmission is processed through the BLE stack 215-220 of the SoC 204 where the transmission is decrypted using the LTK. The decrypted response is then passed to the L2NMP layer 210 on the WIFI master SoC 202. The L2NMP layer 210 then derives the BLE unique identifier (UDID) for the device and stores the BLE device credentials, i.e., the L2NMP Pu-K and UDID, in the L2NMP database 214. In some embodiments, the L2NMP layer 210 cannot derive the UDID. In such embodiments, the L2NMP application layer 224 sends both the L2NMP Pu-K and the UDID to the L2NMP layer 210 when the key is requested.

FIG. 5 is a sequence chart illustrating authentication of a BLE device 102-106 using L2NMP when the device has rejoined the gateway 110. The illustrated command sequence is triggered in the L2NMP layer 210 of the WSN gateway 110 after the rejoining BLE device is rejoined to the WSN gateway 110. A BLE device is rejoined to the WSN gateway using BLE linking and pairing with Just Works authentication between the BLE device and the BLE master SoC 204. The end result of the linking and pairing is an encrypted connection between the BLE device and the BLE master SoC 204 that uses a long term key (LTK) shared by the BLE stack 215-220 on the BLE master SoC and the BLE stack 222 on the BLE device.

As illustrated in FIG. 5, once the joining is complete, the L2NMP layer 210 of the WSN gateway 110 generates a nonce N and sends N to the L2NMP application layer 224 of the BLE device. A nonce is a random or pseudo-random number that may only be used once as part of an authentication protocol to ensure that old communications cannot be reused in replay attacks.

A packet with the nonce N is processed through the BLE stack 215-220 of the BLE master SoC 204 for transmission to the BLE device via the encrypted connection and is thus encrypted prior to transmission using the LTK. When received by the BLE device, the encrypted packet is processed through the BLE stack 222 of the BLE device where the packet is decrypted using the LTK. The decrypted nonce N is then passed to the L2NMP application layer 224 on the BLE device.

In response, the L2NMP application layer 224 generates a nonce M and encrypts N+M with the L2NMP private key. The L2NMP application layer 224 then sends the encrypted value and the value of the nonce M back to the L2NMP layer 210. The response packet is processed through the BLE stack 222 of the BLE device for transmission to the WSN gateway 110 via the encrypted connection between the device and BLE master SoC 204 and is thus encrypted prior to transmission using the LTK. When received by the BLE master SoC 204, the encrypted transmission is processed through the BLE stack 215-220 of the SoC 204 where the transmission is decrypted using the LTK.

The LTK decrypted response is then passed to the L2NMP layer 210 on the WIFI master SoC 202. At this point, the value of the nonce M is decrypted but the value of N+M is not. The L2NMP layer 210 then decrypts the encrypted value of N+M using the L2NMP public key stored in the L2NMP database 214. The L2NMP layer 210 may then authenticate the BLE device by comparing the decrypted N+M to the sum of the nonce M and the nonce N. For example, the L2NMP layer 210 may determine if the difference between the decrypted N+M and the nonce M is equal to the value of the nonce N. Thus, the WSN gateway 110 can authenticate a rejoining device based on the L2NMP public key of the device.

Figure 6:
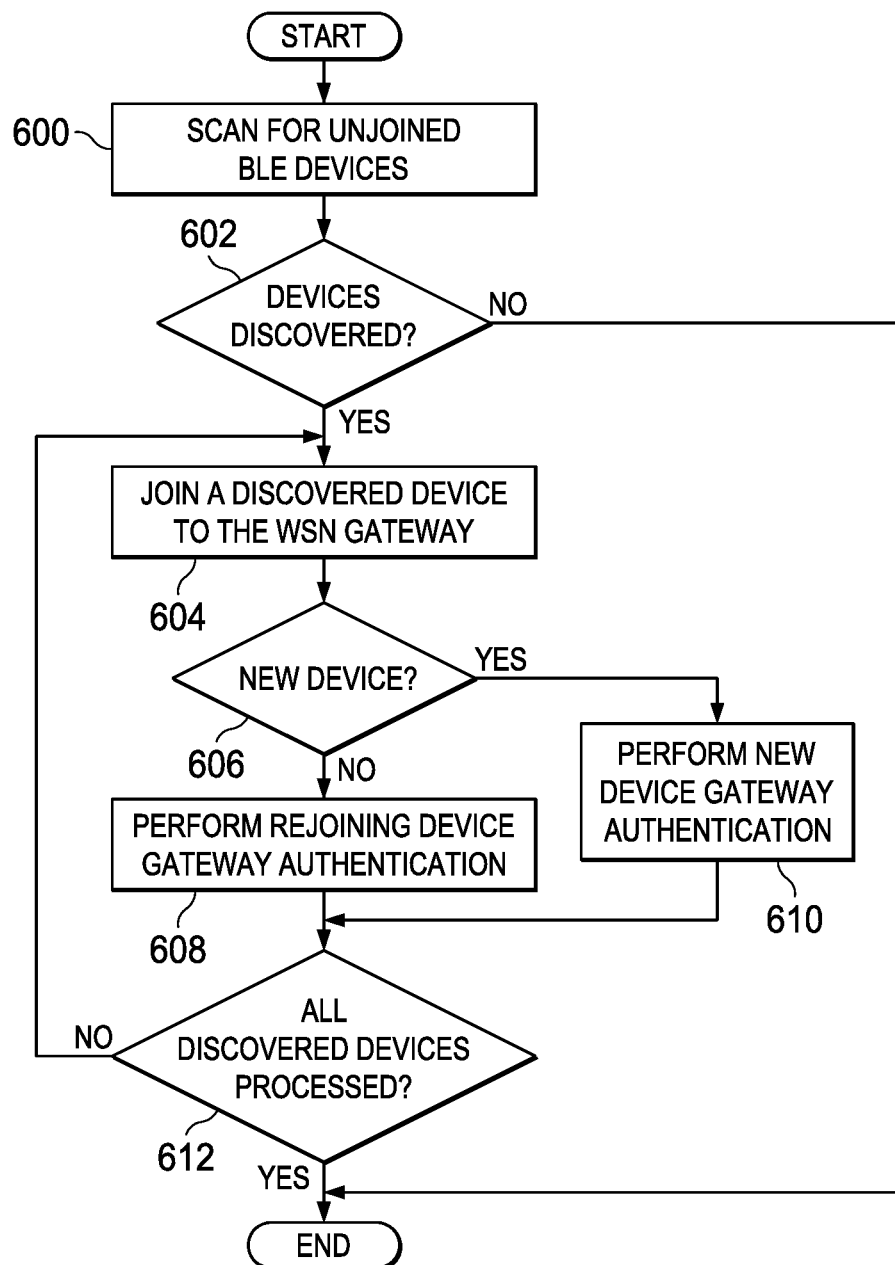
FIG. 6 is a flow diagram of a method for secure network authorization of a BLE device in a WSN gateway.

FIG. 6 is a flow diagram of a method for secure network authorization of a BLE device in a WSN gateway. The method is described in reference to the WSN gateway 110 of FIG. 2 for example purposes. One of ordinary skill in the art will understand embodiments for other suitably configured WSN gateways. Initially, the WSN gateway scans 600 for unjoined BLE devices according to the BLE protocol. If no unjoined BLE devices are discovered 602, the method terminates.

If one or more unjoined BLE devices are discovered 612, each discovered device is joined and authenticated 604-612. For each discovered BLE device 612, the discovered BLE device is joined 604 to the WSN gateway 110 using BLE linking and pairing with Just Works authentication between the BLE device and the WSN gateway 110. If the discovered BLE device is joining the WSN gateway 110 for the first time 606, then new device gateway authentication is performed 608. This authentication is described above in reference to FIG. 4. If the discovered BLE device is rejoining the WSN gateway 110, then rejoining device gateway authentication is performed. This authentication is described above in reference to FIG. 5. When all discovered devices are processed 612, the method terminates.

FIG. 7 is a flow diagram of a method for secure network authorization in a BLE device joining a WSN gateway for the first time. The method is described in reference to the WSN gateway 110 of FIG. 2 for example purposes. One of ordinary skill in the art will understand embodiments for other suitably configured WSN gateways. Initially, the BLE device joins 700 the WSN gateway 110 using BLE linking and pairing with Just Works authentication. Once joined to the gateway 110, the BLE device receives 702 a request from the WSN gateway 110 for the gateway link layer public key via the LTK encrypted connection established during the linking and pairing. Responsive to the request, the BLE device generates 704 the link layer public key/private key pair and returns the public key to the WSN gateway 110 via the LTK encrypted connection.

FIG. 8 is flow diagram of a method for secure network authorization in a BLE device rejoining a WSN gateway. The method is described in reference to the WSN gateway 110 of FIG. 2 for example purposes. One of ordinary skill in the art will understand embodiments for other suitably configured WSN gateways. This method assumes that a BLE device rejoining the gateway was authenticated to the gateway as per the method of FIG. 7 in after an initial joining and thus has already generated the gateway link layer public/private key pair.

Initially, the BLE device joins 800 the WSN gateway 110 using BLE linking and pairing with Just Works authentication. Once joined to the gateway 110, the BLE device receives 802 a nonce N from the WSN gateway 110 via the LTK encrypted connection established during the linking and pairing. Responsive to receiving the nonce N, the BLE device generates 804 a nonce M and computes N+M. The BLE device then encrypts 806 the value of N+M using the link layer private key and returns 808 the nonce M and the encrypted N+M to the WSN gateway 110 via the LTK encrypted connection.

Figure 9:
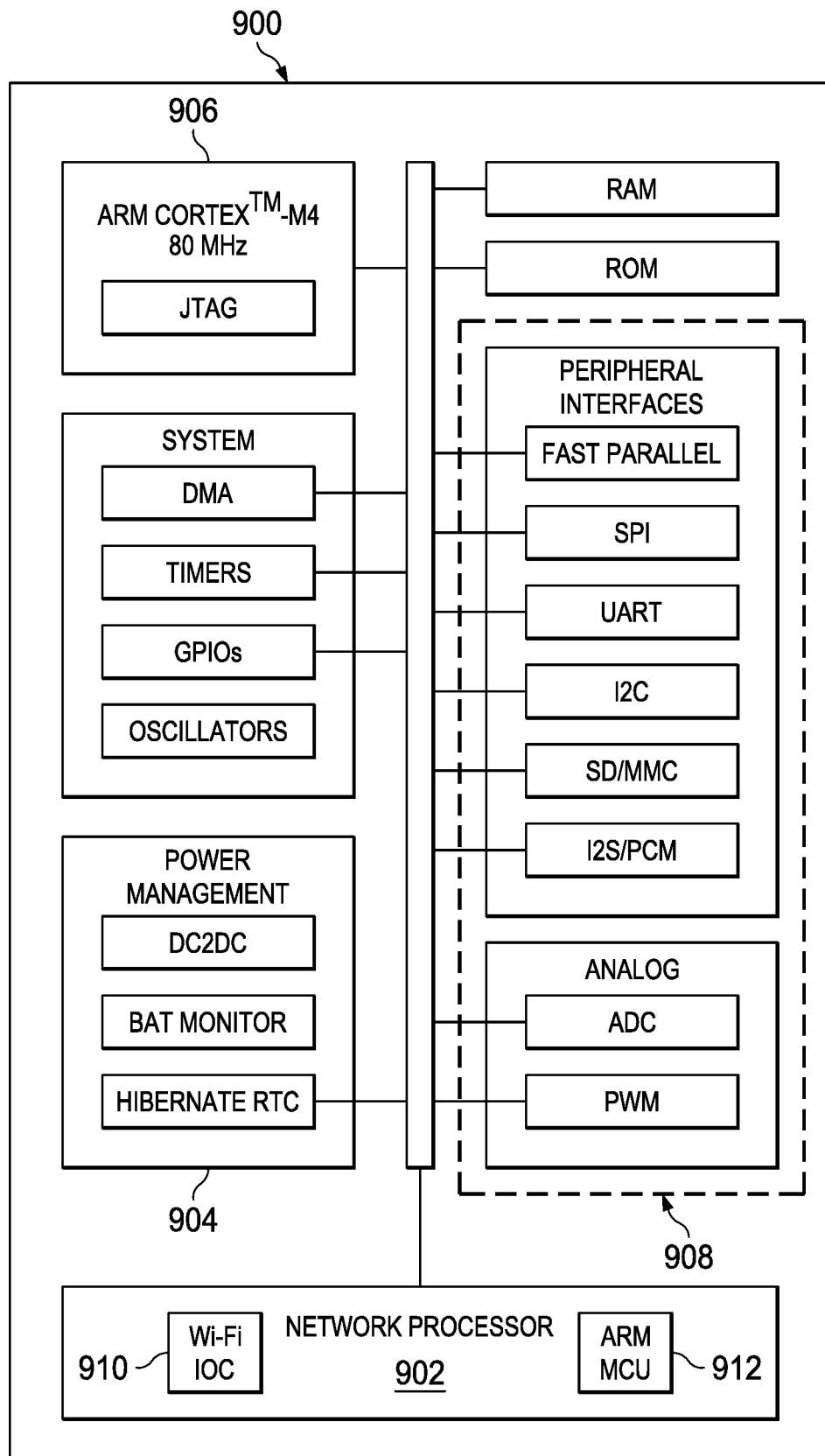
FIG. 9 is a simplified block diagram of an example Wi-Fi system-on-a-chip (SoC) that may be deployed as the Wi-Fi master SoC in a WSN gateway.

FIG. 9 is a simplified block diagram of an example WIFI SoC 900 that may be deployed as the WIFI master SoC in a WSN gateway. More specifically, the example WIFI SoC 900 may be embodied as a CC3200 SimpleLink™ Wi-Fi® wireless microcontroller (MCU) integrated circuit (IC) available from Texas Instruments. A brief description of the CC3200 is provided herein. A detailed description of the CC3200 is provided in Texas Instruments publication SWA3032F, "CC3200 SimpleLink™ Wi-Fi® and Internet-of-Things Solution, a Single-Chip Wireless MCU," July 2013, revised February 2015, which is incorporated by reference herein.

The MCU 900 is a Wi-Fi certified single-chip MCU with built-in Wi-Fi connectivity. The MCU incorporates an applications MCU 906, a Wi-Fi network processor 902, and various power management subsystems 904. The applications MCU 906 includes an 32-bit ARM® Cortex®-M3 as the main processor, up to 256 KB of static random access memory (SRAM) that can be used for both storage of data and execution of code, and a dedicated read-only memory (ROM). General peripherals/modules 908 on the MCU 900 may include a 12-bit analog-to-digital converter (ADC), interfaces for SPI and UART protocols, internal direct memory access (DMA), a real-time clock, multiple timers, a hardware encryption engine, and more.

The power-management subsystem 904 includes integrated DC-DC converters supporting a wide range of supply voltages. This subsystem 904 enables low-power consumption modes, such as the hibernate with RTC mode requiring less than 4 µA of current.

The Wi-Fi network processor subsystem 902 includes a Wi-Fi Internet-on-a-Chip (IOC) 910 and an additional dedicated ARM MCU 912 that completely offloads Wi-FI and Internet protocols from the applications MCU 906. The network processor subsystem 902 also includes an 802.11 b/g/n radio, baseband, media access control (MAC), and a hardware encryption engine. The Wi-Fi IOC 910 includes embedded TCP/IP and TLS/SSL stacks, an HTTP server, and multiple Internet protocols.

Software instructions implementing the gateway side of authentication functionality as described herein may be stored in a computer readable medium on the MCU 900 such as the RAM or the ROM on the MCU 900 and executed by the main processor 906.

Figure 10:
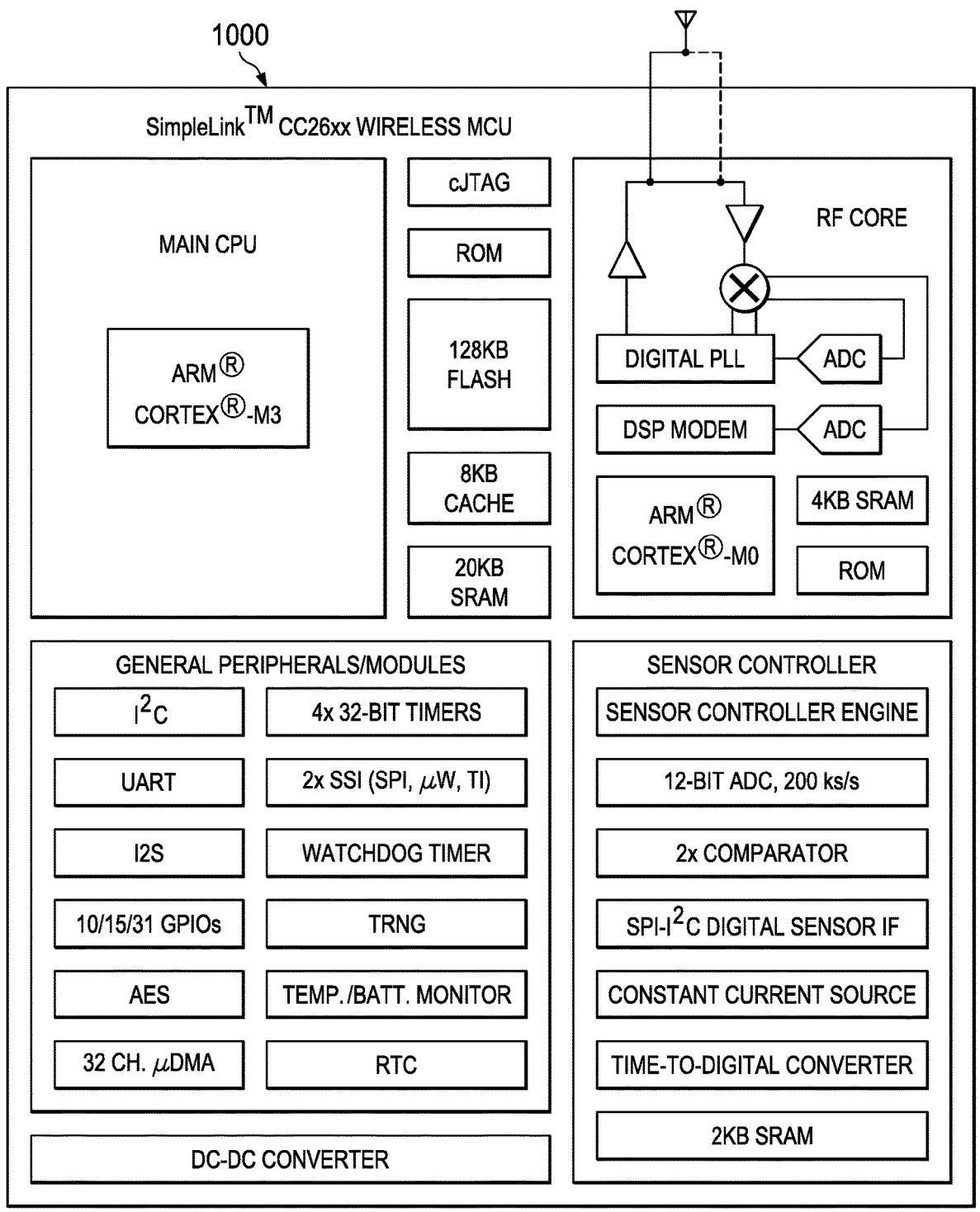
FIG. 10 is a simplified block diagram of an example wireless sensor device that may be deployed as a BLE device in a WSN or the BLE master SoC in a WSN gateway.

FIG. 10 is a simplified block diagram of an example wireless sensor device 1000, e.g., a wireless communication device, that may be deployed as a BLE device in a WSN or the BLE master SoC in a WSN gateway. When deployed as a BLE device, the wireless sensor device 1000 may be configured to perform the device side of network authentication as described herein. When deployed as the BLE master SoC in a WSN gateway, the wireless sensor device 1000 may be configured to perform the BLE master functionality described herein. More specifically, the example wireless sensor device 1000 may be embodied as a CC26xx SimpleLink™ Multistandard wireless microcontroller (MCU) integrated circuit (IC) available from Texas Instruments. The CC26xx family of ultralow-power microcontrollers includes multiple devices featuring an ultralow power CPU and different peripherals targeted for various applications. The particular MCU depicted is the CC2650. A brief description of the CC2650 is provided herein. A detailed description of the CC2650 is provided in Texas Instruments publication SWRS158, "CC2650 SimpleLink™ Multistandard Wireless MCU," February 2015, which is incorporated by reference herein.

The MCU 1000 incorporates a 32-bit ARM® Cortex®-M3 as the main processor and a peripheral feature set that includes an ultra-low power sensor controller for interfacing external sensors and/or collecting analog and digital data autonomously while the rest of the system is in sleep mode. The MCU 1000 also incorporates an RF core based on an ARM® Cortex®-M0 processor. The RF core is designed to autonomously handle time critical aspects of various radio protocols. The RF core includes a dedicated 40 KB static random access memory (SRAM) and a dedicated read-only memory (ROM).

The MCU 1000 also incorporates 128 KB of flash memory that provides nonvolatile storage for code and data, 20 KB of SRAM that can be used for both storage of data and execution of code, and a ROM storing a real-time operating system kernel and some lower layer protocol stack software. General peripherals/modules on the MCU 1000 may include a 12-bit ND converter, a 16-channel comparator with voltage reference generation and hysteresis capabilities, interfaces for SPI, Microwire, and UART protocols, internal direct memory access (DMA), a real-time clock, multiple 16/32-bit timers, and more.

Software instructions implementing the device side of authentication and/or the BLE master functionality as described herein may be stored in a computer readable medium on the MCU 1000 such as the flash memory, the SRAM, or the ROM on the MCU 1000 and executed by the main CPU.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, embodiments have been described herein in which the non-IP device being authenticated implements BLE. One of ordinary skill in the art will understand embodiments based on other non-IP protocols such as, for example, ZigBee and BLE Mesh. In such embodiments, the L2MNP application may be implemented on top of the network protocol stack and a secure joining procedure of the non-IP protocol may be used to create the encrypted connection needed to perform the network authentication.

In another example, the non-IP devices have been described herein as wireless sensor devices and the network has been characterized as a wireless sensor network. One of ordinary skill in the art will understand embodiments in which a non-IP device is not a sensor device, e.g., a remote control or a switch.

In another example, the authentication of a device rejoining the gateway has been described herein as being based on the sum of two nonces N and M. One of ordinary skill in the art will understand embodiments in which other mathematical or logical combinations of the two nonces are used, e.g., N−M, N×M, or N/M.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in systems may be referred to by different names and/or may be combined in ways not shown herein without departing from the described functionality. This document does not intend to distinguish between components that differ in name but not function. In the description and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A method comprising:
    establishing an encrypted connection between a first network device and a second network device;
    receiving, by the first network device, a public key of the second network device via the encrypted connection;
    transmitting, by the first network device, a first value to the second network device via the encrypted connection;
    receiving, by the first network device, a first transmission that includes a combination of the first value and a second value encrypted by a private key that corresponds to the public key;
    decrypting the first transmission using the public key; and
    authenticating, by the first network device, the second network device based on the decrypted first transmission.

2. The method of claim 1, wherein:
    the establishing of the encrypted connection includes establishing a shared key between the first network device and the second network device; and
    each of the public key received by the first network device, the first value transmitted to the second network device, and the first transmission is encrypted using the shared key.

3. The method of claim 1 further comprising receiving, by the first network device, a second transmission that includes the second value.

4. The method of claim 3, wherein the authenticating includes comparing the second value in the second transmission to the combination of the first value and the second value in the decrypted first transmission.

5. The method of claim 1 further comprising:
    scanning, by the first network device, to discover a device to join in communication, wherein the scanning discovers the second network device; and
    in response to discovering the second network device, determining whether the second network device has been previously joined in communication, wherein the transmitting of the first value is performed in response to the second network device having been previously joined in communication with the first network device.

6. The method of claim 1, wherein the encrypted connection uses a non-internet protocol.

7. The method of claim 6, wherein the encrypted connection is a Bluetooth Low Energy connection.

8. The method of claim 1, wherein the combination of the first value and the second value is a sum of the first value and the second value.

9. The method of claim 1, wherein the second network device includes a wireless network sensor device.

10. A first network device comprising:
    at least one processor; and
    a non-transitory memory storing instructions that when executed cause the at least one processor to:
        establish communication with a second network device;
        receive a request for a public key from the second network device;
        provide the public key to the second network device;
        receive a first value from the second network device;
        determine a combination of the first value and a second value;
        encrypt the combination of the first value and the second value using a private key that correspond to the public key; and
        provide a first transmission to the second network device that includes the encrypted combination of the first value and the second value.

11. The first network device of claim 10, wherein the instructions to establish communication with the second network device include instructions that cause the at least one processor to establish a shared key between the first network device and the second network device.

12. The first network device of claim 11, wherein:
the request for the public key and the first value received from the second network device are encrypted using the shared key;
the instructions to provide the public key include instructions to encrypt the public key using the shared key; and
the instructions to provide the first transmission include instructions to encrypt the first transmission using the shared key.

13. The first network device of claim 11, wherein the instructions include further instructions that cause the at least one processor to provide a second transmission that includes the second value and that is encrypted using the shared key.

14. The first network device of claim 13, wherein the second transmission is not encrypted using the private key.

15. The first network device of claim 10, wherein the instructions cause the at least one processor to receive the request for the public key, provide the public key, receive the first value, and provide the first transmission via a wireless connection with the second network device.

16. The first network device of claim 15, wherein the wireless connection is a Bluetooth Low Energy connection.

17. A first network device comprising:
at least one processor; and
a non-transitory memory storing instructions that when executed cause the at least one processor to:
determine that a second network device has been previously joined to the first network device in communication; and
in response to the second network device being previously joined:
generate a first value;
transmit a first value to the second network device;
receive a first transmission from the second network device that includes a combination of the first value and a second value and that is encrypted using a private key associated with the second network device;
decrypt the first transmission using a public key associated with the second network device; and
authenticate the second network device base on the combination of the first value and the second value in the decrypted first transmission.

18. The first network device of claim 17, wherein the instructions include further instructions that cause the at least one processor to receive a second transmission from the second network device that includes the second value, wherein the second transmission is not encrypted using the private key.

19. The first network device of claim 17, wherein the instructions include further instructions that cause the at least one processor to:
transmit a request for the public key, wherein the request for the public key is encrypted using a shared key; and
receive the public key from the second network device encrypted using the shared key.

20. The first network device of claim 17, wherein the instructions include instructions that cause the at least one processor to transmit the first value and receive the first transmission via Bluetooth Low Energy.

* * * * *